United States Patent [19]
Andler et al.

[11] 3,802,051
[45] Apr. 9, 1974

[54] DETECTING MECHANISM FOR DETECTING A MISSING OR DISPLACED FILM END PORTION OF A FILM MAGAZINE

[75] Inventors: Richard C. Andler; Richard Irving Kinsella, both of Rochester, N.Y.

[73] Assignee: Eastman Kodak Company, Rochester, N.Y.

[22] Filed: Jan. 12, 1973

[21] Appl. No.: 323,173

[52] U.S. Cl.................. 29/208 C, 29/208 D, 53/67
[51] Int. Cl............................................. B23p 19/04
[58] Field of Search.......... 29/208 C, 208 D, 200 B; 53/67, 118, 64; 83/64; 113/80 C

[56] References Cited
UNITED STATES PATENTS

| | | | |
|---|---|---|---|
| 1,767,818 | 6/1930 | Smulski............................ | 53/303 X |
| 2,198,225 | 4/1940 | Newey.................................. | 53/64 |
| 2,616,541 | 11/1952 | Smith.................................... | 53/64 |
| 2,915,029 | 12/1959 | Hohl et al. ........................ | 113/80 C |
| 3,092,941 | 6/1963 | Baker................................. | 83/64 X |
| 3,226,816 | 1/1966 | Wilson et al. .................. | 29/200 B X |
| 3,364,551 | 1/1968 | Napor et al........................ | 29/208 D |
| 3,364,552 | 1/1968 | Napor et al........................ | 29/208 D |
| 3,452,651 | 7/1969 | Vadas et al. ........................ | 53/67 X |
| 3,457,627 | 7/1969 | Napor et al........................ | 29/208 D |

Primary Examiner—Thomas H. Eager
Attorney, Agent, or Firm—Steve W. Gremban

[57] ABSTRACT

A detecting mechanism in a film magazine spooling machine for detecting a missing or displaced film end portion of a film magazine. The detecting mechanism comprises a sensing mechanism movable to a position for sensing the edge of an accurately positioned web end portion. If such web end portion is missing or displaced, and hence not sensed, a signal generated by the sensing mechanism inhibits a machine function logic control circuit inhibiting machine functions, such as the operation of an end cap staking mechanism. The signal further actuates a diverting mechanism for diverting the defective magazine, and an annunciator to alert the operator.

7 Claims, 4 Drawing Figures

DETECTING MECHANISM FOR DETECTING A MISSING OR DISPLACED FILM END PORTION OF A FILM MAGAZINE

BACKGROUND OF THE INVENTION

1. Field of the Invention

This invention relates generally to detectors, and more specifically to a detecting mechanism for a magazine spooling machine for detecting a missing or displaced film end portion of a film magazine.

2. Description of the Prior Art

It is known in the photographic industry to provide cylindrical film cans or magazines having a light-tight cap at one end and a light-tight magazine mouth formed by axially extending, peripheral spaced-apart lips to which plush material is secured in facing relation. In the manufacture of film magazines under darkroom conditions, a roll of unexposed light-sensitive film is fed into the outer free end of each magazine with a leading end portion thereof extending through a light-tight mouth of the magazine. The magazine containing the film is positioned in a forming or capping jaw which compresses the outer free end of the magazine to the precise shape for receiving an end cap. An end cap is fed from an end cap source to a position in alignment with the magazine, and the end cap advanced by a staking mechanism onto or over the free end of the magazine. A portion of the staking mechanism is expanded, crimping the rim of the end cap to the end of the magazine to form a completed light-tight film magazine. Problems have arisen in situations in which the film end portion extending from the magazine is either missing or displaced toward the open end of the magazine. In those situations in which the web end portion is completely missing, a defective film magazine results which is unusable in a camera. In those situations in which the web end portion is displaced toward the open end of the magazine, an edge of the end portion is usually caught in the end cap as the cap is pushed over the end of the magazine and staked thereto. Accordingly, a film magazine results in which the film is also staked to the magazine and cannot be pulled out of the magazine. Unfortunately, undiscovered film magazines having missing or displaced film end portions may result in the sale to customers of defective film magazines.

SUMMARY OF THE INVENTION

This invention includes within its scope a detecting mechanism for detecting a missing or displaced film end portion of a film magazine, and in response thereto inhibiting the operation of an end cap staking mechanism, among other things. In a preferred embodiment of the detecting mechanism, a fluidic sensing means is moved to a position for sensing the edge of an accurately positioned film end portion, and if such film end portion is missing or displaced toward the open end of the magazine, and hence not sensed, a signal is generated for inhibiting a machine function logic control circuit controlling the operation of the end cap staking means and other machine functions. Accordingly, when the machine function logic control circuit is inhibited, the end cap staking means and other machine functions are inhibited. In addition, the signal actuates a defective magazine diverting means for diverting the defective film magazine, when released, and actuates an annunciator or the like to alert the operator.

Accordingly, one of the objects of the present invention is to provide a detecting mechanism for detecting an accurately positioned film end portion extending from a film magazine, and in response thereto, staking an end cap onto the film magazine.

Another object of the invention is to provide a detecting mechanism for detecting a missing or displaced film end portion of a film magazine, and in response thereto, inhibiting the operation of a staking mechanism so that an end cap is not staked onto the film magazine.

Another object of the invention is to provide an improved detecting device for film magazines that eliminates the production of defective film magazines having missing or displaced film end portions.

Another object of the invention is to provide a missing or displaced film end portion detecting mechanism that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawings, in which.

DESCRIPTION OF THE PREFERRED EMBODIMENT

Because detecting mechanisms are well known, the present description will be directed in particular to elements forming part of, or cooperating more directly with, apparatus in accordance with the present invention. Detector elements and logic components not specifically shown or described herein should be understood to be selectable from those known in the art.

Figure 1:
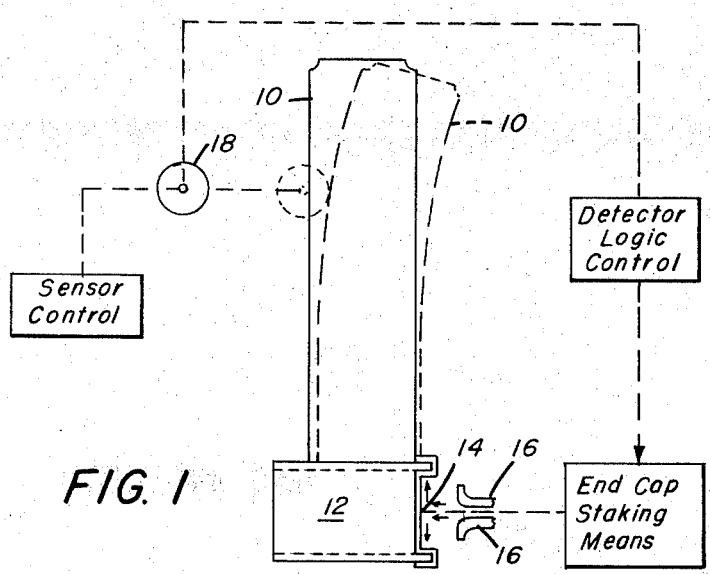
FIG. 1 is a top plan view of a film magazine and film end portion extending therefrom, and illustrating in schematic block diagram form a preferred embodiment of the detecting mechanism of this invention.

With reference to the drawings, a preferred embodiment of a detecting mechanism for detecting missing or displaced film end portions 10 extending from a film magazine 12 is illustrated in connection with a capping device, not shown, of a spooling machine for mounting an end cap 14 onto film magazine 12 and staking it thereto in light-tight relation. The capping device is of a type generally known in the art, comprising jaws, not shown, for holding magazine 12, and staking arms 16, only a segment of which is shown, axially movable in the direction indicated by an arrow into engagement with end cap 14, and then moved generally radially outwardly, as indicated by arrows, for engaging the inner wall of end cap 14 and crimping it to magazine 12 to form a light-tight seal. A problem has developed in those situations in which the film end portion 10 extending from film magazine 12 is displaced toward the end cap, as shown dotted in FIG. 1. In such situations, when end cap 14 is staked onto film magazine 12, the edge of the film end portion 10, which partially extends into the end cap, is staked to the magazine also. Accordingly, the film cannot be pulled out of the film magazine 12. A problem also occurs in those situations in which film end portion 10 is completely missing, resulting in a defective film magazine. The detecting mechanism of this invention solves the aforementioned problems by providing a fluidic sensing means 18 movable to a sensing position (shown dotted in FIG. 2) in which it senses an accurately positioned film end portion, and in such event does not interfere with the machine function logic control circuit controlling the staking mechanism. However, if sensing means 18, when moved to its sensing position, fails to sense an accurately positioned film end portion 10, thereby indicating that the film end portion is either missing or displaced, the machine function logic control circuit is inhibited, preventing operation of machine functions, such as operation of the staking mechanism. In addition, a defective magazine diverting mechanism is actuated to divert the defective film magazine, when released by the jaws, and an annunciator is actuated to alert the operator.

Figure 2:
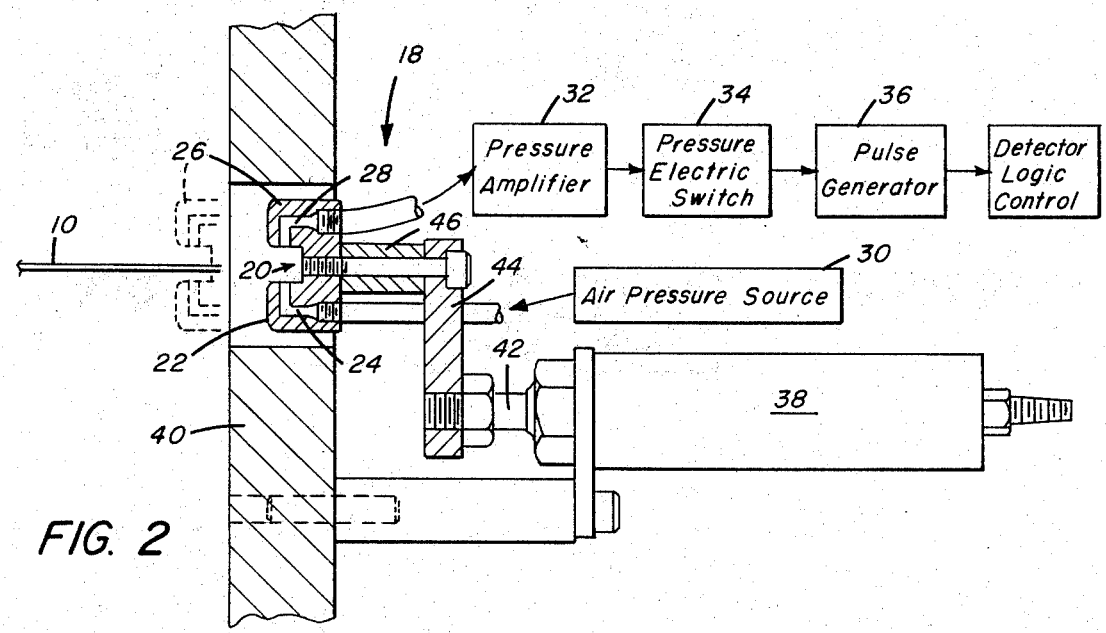
FIG. 2 is a side elevational view, partially in section and block diagram form, illustrating the sensor and sensor control of FIG. 1.

The fluidic sensing means or sensor 18, as best illustrated in FIG. 2, comprises a U-shaped sensing head 20 in which one leg 22 thereof defines a port 24 connected to any suitable air pressure source 30. The other leg 26 of the sensing head has a port 28 in register with port 24 and connected to any suitable commercially available pressure amplifier 32, such as Schmitt trigger. The output of the trigger 32 controls a pressure electric switch 34 in series with any suitable commercially available pulse generating circuit 36 for generating an electrical pulse (F.S.M.) fed to the overall detector logic control circuit. Normally, when the ports 24,28 are uncovered, the switch 34 is in a normal open position. However, if the air flow through ports 24,28 is interrupted, a pressure is generated which moves switch 34 to its closed position. Such action occurs when sensing head 20 is momentarily moved to its sensing position, as shown dotted in FIG. 2, and an accurately positioned film end portion 10 is present. In such case, switch 34 is moved to and from its closed position, such action momentarily actuating the pulse generating circuit 36 for generating an F.S.M. pulse which is sent to the detector logic control circuit. The sensing head 20 is moved between its normal retracted position, as seen in full lines in FIG. 2, to its sensing position (dotted) by an air cylinder 38 secured to a fixed frame 40. The reciprocally movable rod 42 of cylinder 38 is connected to sensing head 20 by a drive link 44 and spacer 46.

Figure 3:
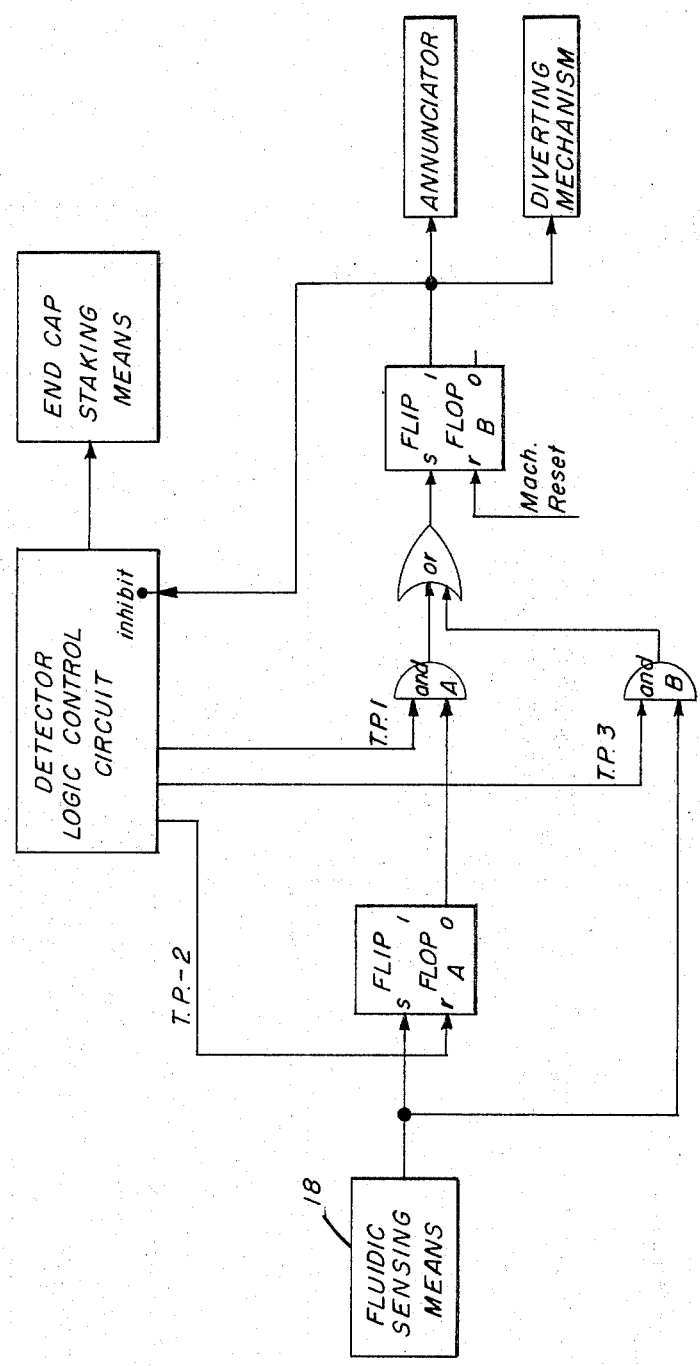
FIG. 3 is a schematic logic circuit diagram of the detecting mechanism of this invention.
Figure 4:
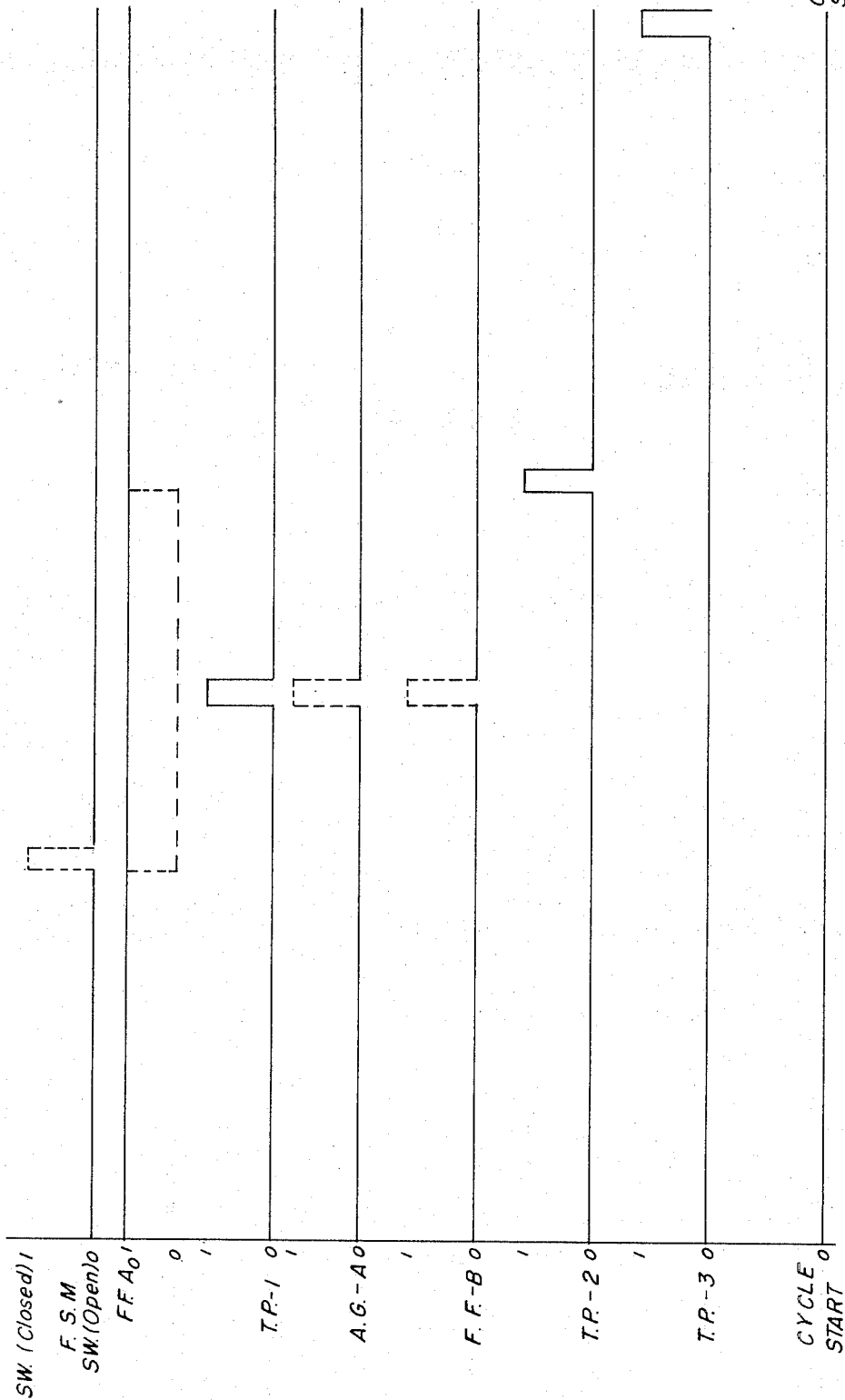
FIG. 4 is a graph illustrating a cycle of operation and the pulses generated by various components of the circuit diagram of FIG. 3.

The detector logic control circuit for interrelating the sensing means to the machine functions, such as the staking means, annunciator, and defective magazine diverting means is best illustrated in FIG. 3. The interrelationship between the F.S.M. signals generated by the fluidic sensing means, and the signals generated by various components of the detector logic control circuit is illustrated in FIG. 4. The detector logic control circuit comprises a flip-flop A (F.F.A.) for receiving the F.S.M. signal instigated by electrical switch 34 of sensing means 18. With switch 34 in its normal open position, which occurs when sensing head 20 is in its normal retracted position, or in its sensing position with film end portion 10 displaced or missing, the F.S.M. signal applied to flip-flop A is designated logic 0. However, when switch 34 is momentarily closed, which occurs when film sensing head 20 is moved to its sensing position and senses an accurately aligned film end portion 10, the F.S.M. signal pulse fed to flip-flop A is designated logic 1. Accordingly, when an accurately positioned film end portion 10 is sensed, a pulse signal 1, shown dotted in FIG. 4, is applied to flip-flop A, setting flip-flop A and causing an output 0, shown dotted, to be fed to AND gate A (A.G.A.). This results in an output 0, shown by a full line, from AND gate A, which is applied to an OR gate, in turn feeding an 0 signal to flip-flop B (F.F.B). Since flip-flop B had been previously reset, an output 0 from flip-flop B, shown by a full line in FIG. 4, is fed to the machine function logic control circuit. Accordingly, the logic control, annunciator, and defective magazine diverting mechanism are not actuated and remain in their normal inactive state. However, if the sensing means 18 does not sense a film end portion 10 when moved to its sensing position, thereby indicating a displaced or missing film end portion 10, switch 34 remains open, and the pulse generating circuit feeds an F.S.M. 0 signal, shown by a full line in FIG. 4, into flip-flop A. Since flip-flop A had been previously reset, an output 1, shown by a full line, along with a timing pulse (T.P.I.) of logic 1 from the machine function logic control circuit, is applied to AND gate A. The pulse output 1 of AND gate A, shown dotted, is applied to the OR gate, and the output 1 of the OR gate is applied to flip-flop B. Since flip-flop B had been previously reset by the spooling machine, the output 1 sets flip-flop B, causing a pulse output 1, shown dotted, to be fed to the machine function logic control inhibit terminal, annunciator, and defective magazine diverting mechanism. Accordingly, the logic control inhibits the end cap staking means so that an end cap is not staked on the magazine, an annunciator is actuated to alert the operator, and the defective magazine diverting mechanism is actuated for diverting the defective film magazine, when released. A timed pulse T.P.2 of logic 1 from the logic control circuit is applied to flip-flop A to reset it for the next cycle of operation. If for some reason switch 34 should remain closed after the sensing head 20 is returned to its normal retracted position, an interrogation pulse T.P.3 of logic 1 from the logic control is applied at the end of the cycle of operation to AND gate B, along with the signal 1 from switch 34. This causes a signal 1 to be applied to the OR gate, and output 1 from the OR gate to be applied to flip-flop B. Flip-flop B has an output 1 which is fed to the machine function logic control inhibit terminal, annunciator, and defective magazine diverting mechanism to inhibit the staking and other machine operations to permit correction of the malfunctioning switch 34.

The invention has been described in detail with particular reference to a preferred embodiment thereof, but it will be understood that variations and modifications can be effected within the spirit and scope of the invention as described hereinabove.

We claim:

1. In a film detecting and magazine end cap staking mechanism for detecting an accurately positioned film end portion extending from a film magazine, and in response thereto staking an end cap onto the film magazine, the combination comprising:

detecting means for detecting an accurately positioned film end portion extending from a film magazine and generating a predetermined signal in response thereto; and staking means responsive to said predetermined signal for staking an end cap onto a film magazine.

2. The invention according to claim 1 wherein said detecting means comprises a film sensor, and means for moving said sensor between a normal retracted position and a film sensing position in which it senses the edge of an accurately positioned film end portion.

3. The invention according to claim 2 wherein said moving means comprises an air cylinder coupled to said film sensor.

4. The invention according to claim 1 wherein said detecting means comprises a film sensor, and means for moving said film sensor between a normal retracted position and a film sensing position in which it senses the edge of an accurately positioned film end portion, and said staking means comprises a staking mechanism, and a logic control coupled to said staking mechanism and responsive to said predetermined signal for operating said staking mechanism.

5. In a film detecting and magazine end cap staking mechanism for detecting a missing or inaccurately positioned film end portion extending from a film magazine and in response thereto inhibiting the staking of an end cap onto the film magazine, the combination comprising:

staking means for staking an end cap onto a film magazine;

detecting means for detecting an accurately positioned film end portion and generating a predetermined signal in response thereto, and generating a different signal when a film end portion is missing or inaccurately positioned; and logic circuit means coupled to said staking means and responsive to said different signal for inhibiting operation of said staking means so that an end cap is not staked onto said film magazine.

6. The invention according to claim 1 wherein said detecting means comprises a film sensor, and means for moving said sensor between a normal retracted position and a film sensing position in which it senses the edge of an accurately positioned film end portion.

7. The invention according to claim 2 wherein said moving means comprises an air cylinder coupled to said film sensor.

* * * * *